United States Patent [19]
Tomioka et al.

[11] 3,940,191
[45] Feb. 24, 1976

[54] MULTIPLE-ROW ROLLER BEARING

[75] Inventors: Shunzo Tomioka; Kinpei Okano; Toshiyuki Kajiwara, all of Hitachi, Japan

[73] Assignee: Hitachi, Ltd., Japan

[22] Filed: Oct. 10, 1973

[21] Appl. No.: 404,892

[30] Foreign Application Priority Data
Oct. 13, 1972  Japan.............................. 47-102487

[52] U.S. Cl................................. 308/187; 308/214
[51] Int. Cl.²......................................... F16C 1/24
[58] Field of Search.......... 308/214, 187, 212, 213, 308/121

[56] References Cited
UNITED STATES PATENTS

| | | | |
|---|---|---|---|
| 1,884,925 | 10/1932 | Vanderbeek | 308/214 |
| 1,909,525 | 5/1933 | Curtis | 308/214 |
| 1,949,824 | 3/1934 | Buckwalter | 308/214 |
| 2,160,418 | 5/1939 | Horger | 308/214 |
| 3,692,372 | 9/1972 | Pineo | 308/214 |

FOREIGN PATENTS OR APPLICATIONS

| | | | |
|---|---|---|---|
| 146,724 | 9/1961 | U.S.S.R. | 308/187 |
| 195,392 | 4/1924 | United Kingdom | 308/187 |
| 930,700 | 7/1963 | United Kingdom | 308/187 |

*Primary Examiner*—Robert R. Song
*Assistant Examiner*—Richard A. Bertsch
*Attorney, Agent, or Firm*—Craig & Antonelli

[57] ABSTRACT

A bearing comprising rows of rollers disposed between the outer and inner races, wherein a nozzle is provided for supplying lubricating oil mist to the entire periphery of the distance piece provided between said outer races, said nozzle being provided with oil supply apertures directed toward the roller end faces adjacent flange end faces of the inner race, said distance piece being also provided at a part thereof with holes or grooves through which oil can be discharged, said holes or grooves being positioned at a level of or lower than the lowest of roller contacting areas of inner surface of said outer races.

33 Claims, 21 Drawing Figures

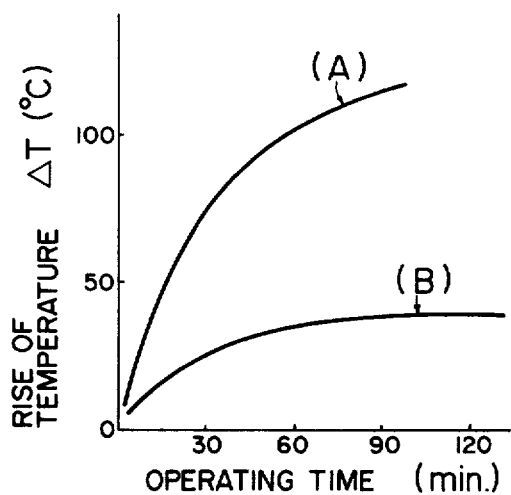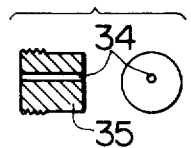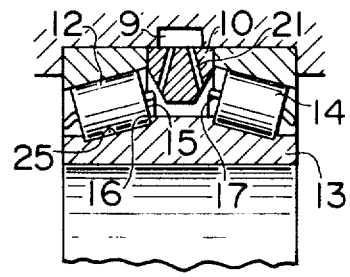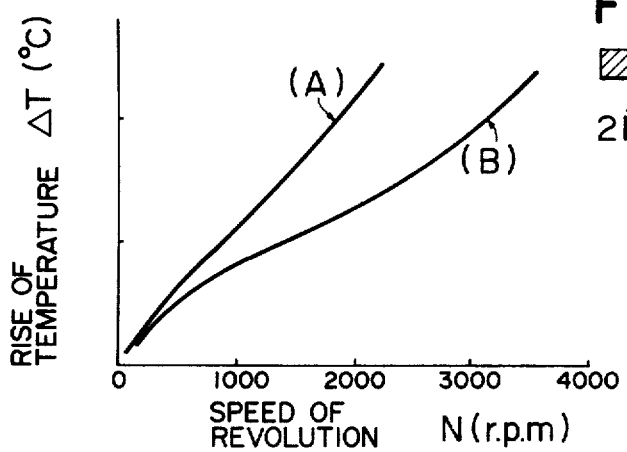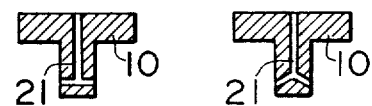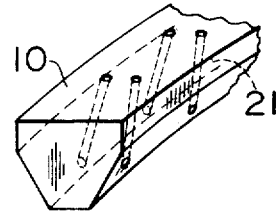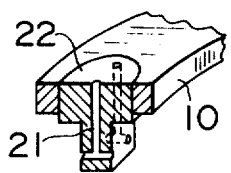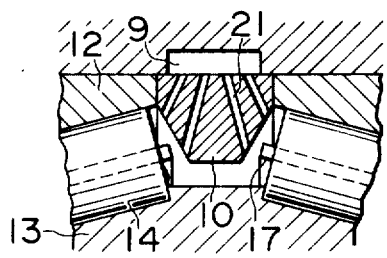

ered bearings with high reliability and durability. However, for development of such high-performance bearings, it is required to provide highly effective and secure lubrication for attaining stabilization of performance.

MULTIPLE-ROW ROLLER BEARING

BACKGROUND OF THE INVENTION

This invention relates to multiple-row roller bearings, particularly large-sized ones, such as used for supporting rolls in rolling mill or for other purposes.

Lately, in order to keep up with increasing speed-up of rolling mills, there is a growing demand for high-performance roll neck roller bearings with high reliability and durability. However, for development of such high-performance bearings, it is required to provide highly effective and secure lubrication for attaining stabilization of performance.

Among the known effective roller bearing lubricating systems is an oil mist lubrication method. According to this method, hot compressed air is supplied into an oil mist generator where the high-viscosity lubricating oil is atomized and injected into the bearing from a nozzle. The atomized lubricating oil, when injected from the nozzle, is turned into coarse particles which are apt to adhere to an object due to fall of temperature caused by adiabatic expansion of air and disturbance of flow caused by injection, and thus dry mist is turned into wet mist. This wet mist impinges against respective parts in the bearing to provide a minimum amount of oil required for sufficient lubrication while that portion of oil which is not required for lubrication is retrieved in the form of floating mist. Thus, the oil mist lubrication system requires only a minimum amount of oil necessitated for lubrication, so that the agitation loss of oil is reduced and also high speed roller bearing lubrication is provided by the cooling action of air.

In the conventional roller bearings, however, above-said merits of the lubricating systems are not necessarily effectuated to the full. That is, in the conventional bearings, in order to prevent oil shortage that is liable to occur at the start of operation, arrangement is made such that the initial charge oil is supplied to the lower portion of the housing so that a part of the bearing will be immersed in the lubricating oil and that there can be maintained a constant oil level. Therefore, this initial charge oil is not discharged but remains in the housing even during operation, and hence even if oil mist lubrication is applied, actual lubrication has mostly depended on the oil bath. Consequently, abnormal rise of bearing temperature that could result in fatal defect to bearing performance would be caused due to increase of agitation loss of oil or increase of agitation heat during high speed rotation.

Particularly in the case of roller bearings, there is produced between the roller end face and the inner race flange face, for the structural reason, a sliding contact portion that takes a share of the thrust load acting in the axial direction, resulting in excessively increased frictional loss as compared with the rolling portion. It was also found that, in the conventional bearings, wet mist impinges against the outer peripheral face of the distance piece and here a substantial portion of mist is condensed and turned into liquid oil, and such oil merely flows down to the lower part of the outer wall of said distance piece, thus little contributing to lubrication. This means that the mist supplied to the lubrication area from the nozzle provided in the distance piece is low in concentration and hence little oil is retrieved in the bearing portion. Consequently, oil shortage would be caused on the roller end faces and inner race flange contact faces which are exposed to the most severe friction conditions, and these parts would often become a heat source causing abnormal rise of temperature.

SUMMARY OF THE INVENTION

The present invention has been deviced to overcome the above-said problems in the conventional lubricating systems. More specifically, the present invention is designed to inhibit any abnormal rise of temperature in the roller bearing by dispensing with the initial charge oil which has been the greatest disadvantage in the prior art oil mist lubricating systems and by forcing out the condensed oil in the housing, instead of allowing such oil to remain in the housing as in the conventional systems.

The present invention is also designed to allow more effective and positive supply of lubricating oil to the rolling areas in the bearing and to the roller end faces so as to arrest or minimize generation of heat in these parts.

It is also envisaged in the present invention to simplify the arrangements required for accomplishing the above-said objects of the invention, so as to improve workability in assemblage, maintenance and inspection.

The salient features of the present invention lie in that a distance piece is provided between the outer races of the bearing provided with plural rows of rollers and that there are also provided around said distance piece the holes or grooves for discharging the condensed oil so that the oil will not stay in the housing, said oil discharging holes or grooves being disposed at a level of or lower than the lowest of roller contacting areas of inner surface of the outer races.

It is also an important feature of the present invention that said outer race distance piece is formed with an integral oil mist injection nozzle projected inwardly of the bearing, so as to facilitate effective supply of lubricating oil to the roller end faces.

The present invention is further featured by an arrangement that allows easy mounting and detachment of said lubricating oil mist nozzle.

The details of the present invention will now be described by way of some embodiments thereof with reference to the accompanying drawings, in which:

FIGS. 7 and 8 are graphs comparatively showing performance of a prior art bearing and a bearing according to the present invention, where curve (A) represents the prior art bearing and curve (B) the bearing of the present invention;

FIG. 9 shows the pressure regulator means in the bearing chamber;

Figure 16:
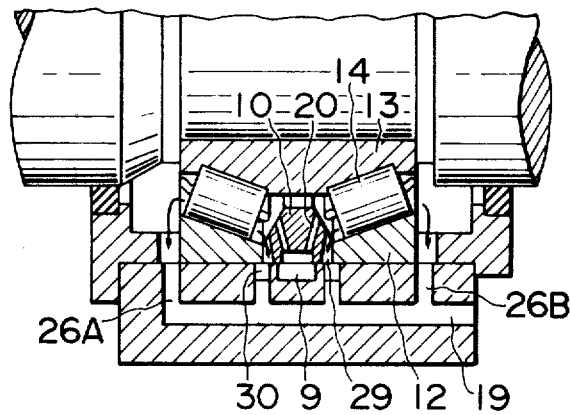
Figure 17:
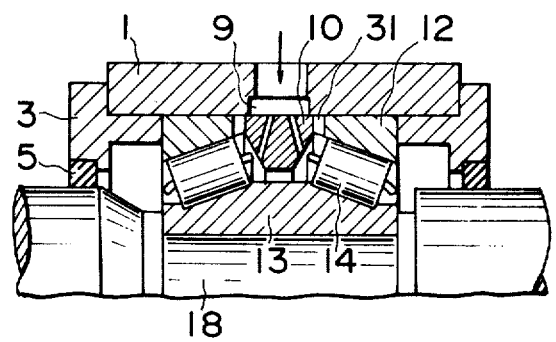
Figure 18:
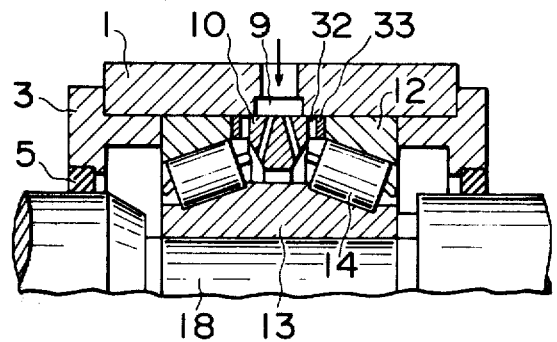
Figure 19:
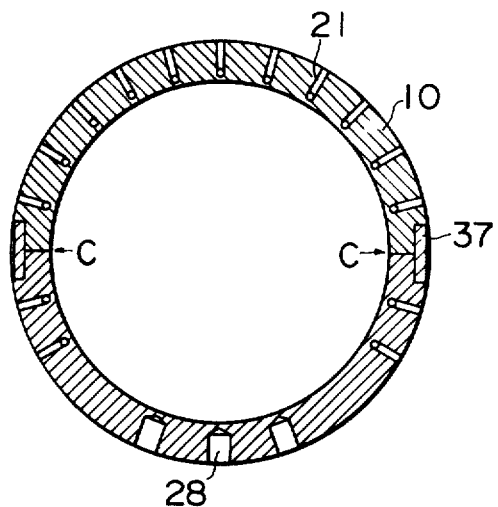
Figure 20:
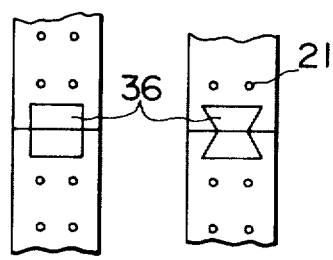
Figure 21:
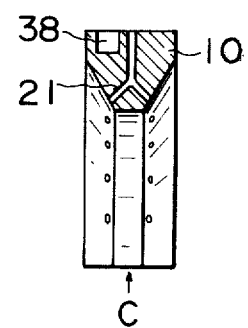

FIGS. 10 to 15 exemplify the configurations of distance piece and injection nozzle, each of these configurations being able to provide effective mist lubrication;

FIGS. 16 to 18 are partial front views showing the bearings according to the present invention where some modifications were made in the air supply and oil discharge mechanisms; and FIGS. 19 to 21 show a distance piece of a split construction, where FIG. 19 shows the entire structure of the distance piece, FIG. 20 shows the coupling arrangement in the split portion, and FIG. 21 shows a distance piece integrated to the assembly by a snap ring.

First, in order to facilitate understanding of the present invention, the foundamental factors and principles upon which the present invention is based are discussed briefly.

Figure 1:
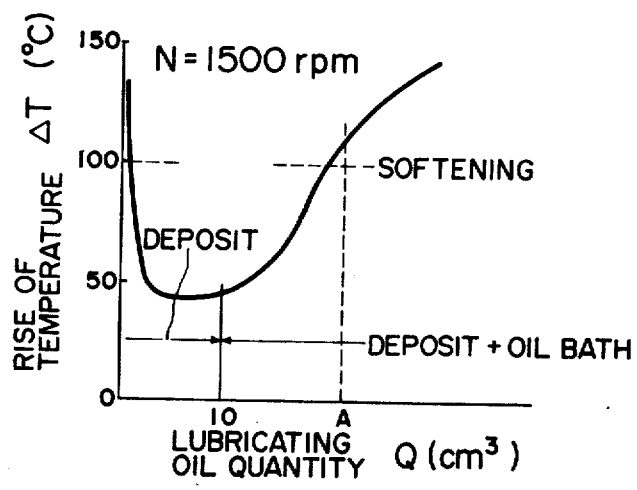
FIG. 1 is a graph showing temperature rise variation caused by lubricating oil charge to bearing, which is the basis of the present invention.
Figure 2:
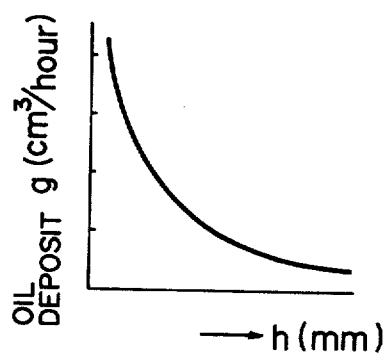
FIG. 2 is a graph showing variation of oil deposit at the lubricating area according to the distance between the nozzle outlet and the lubricating zone.

Referring to FIG. 1, there is shown a graph showing the relation between lubricating oil quantity Q in the bearing and bearing temperature rise $\Delta T$, as observed when the shaft was rotated continuously, at rotating speed N of 1,500 r.p.m. As will be noted, when the lubricating oil quantity Q is sufficient to provide oil deposition over the entire lubricating sections of the rollers and inner and outer races, temperature rise $\Delta T$ shows the minimum value, but when oil quantity is scant, the bearing comes to suffer seizure of burning in a short period of time. On the other hand, in case extra oil is used in addition to normal oil deposition as when accompanied by oil bath lubrication and is gradually incrased, increased, rise $\Delta T$ becomes sharp, and if lubricating oil is provided merely by initial oil bath ($Q = A$) as in the conventional bearings, temperature can reach the softening point of the bearing steel, resulting in disenabled operation or shortening of life of the bearing. FIG. 2 gives data explaining the phenomenon of liquefication of oil mist, that is, it shows the relation of oil deposit $q$ to the distance $h$ between the nozzle outlet and lubricating zone. As apparent from the graph, oil deposit decreases almost in reverse proportion to the distance $h$. The similar tendency is also observed in the air cooling action. Therefore, for achieving improvement of lubricating performance, it is advisable to dispose the injection nozzle adjacent the roller end face which is the heat source, such that oil mist will be deposited on the large end face near the intersection of the roller end face and flange face.

Now, the detail arrangements of the present invention are described by way of some preferred embodiments thereof.

Figure 3:
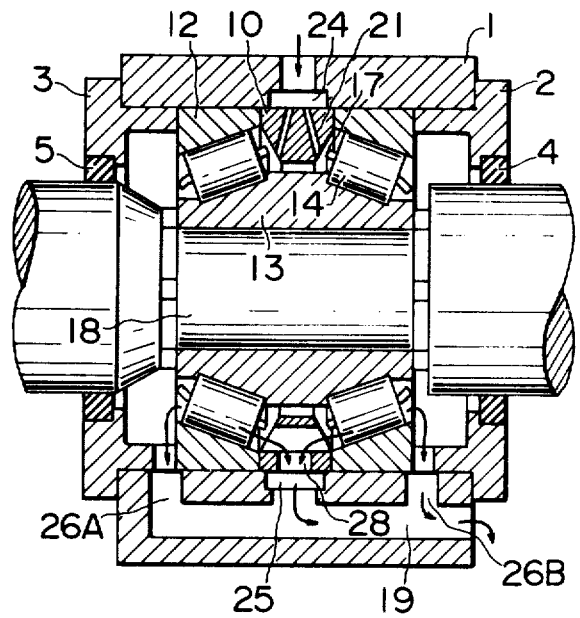
FIGS. 3 and 4 are a front sectional view and a transverse sectional view, respectively, showing an embodiment of the bearing according to the present invention.
Figure 4:
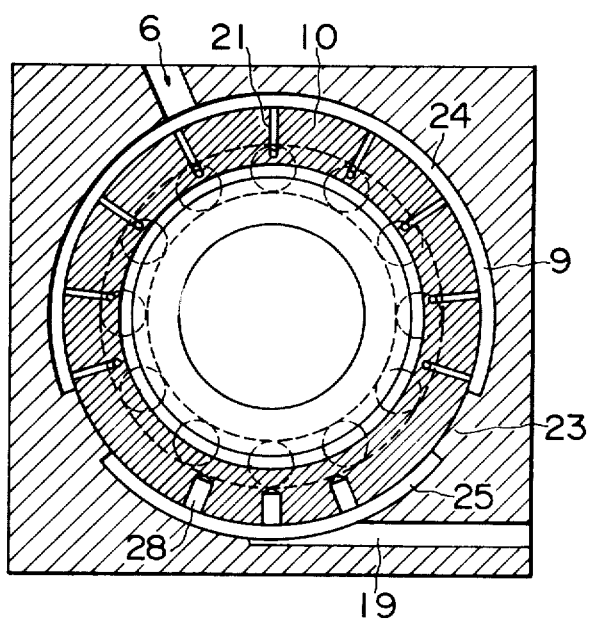

Referring to FIGS. 3 and 4, there is diagrammatically shown an embodiment of the present invention. The housing 1 constituting the bearing shell is assembled from two side walls 2 and 3 arranged to fix the bearing in position Each of said side plates has integrally secured thereto an outer race 12 and a distance piece 10 located between the outer races and is also provided with an oil seal 4, 5 adapted to hermetically shut off the bearing chamber from the outer air. In the bearing chamber, rollers 14 are disposed between an inner race 13 secured to a support shaft 18 such as roll neck and the outer races 12 secured to the housing. In this type of roller bearing, particularly when used for supporting heavy load, rollers are arranged in plural rows, and the outer races 12 used therefor are divided for each row and have a tapered vertical sectional shape. Assemblage of rolling mechanism is accomplished by inserting a distance piece 10 between every adjoining outer races 12 successively. Rollers 14 are fixed in position by means of retainers 17. The distance piece 10 has a trapezoidal portion projecting into the bearing chamber and is provided with small holes 21 serving as lubricating oil mist injection nozzles. Each said hole 21 is arranged so as to be directed in a direction of an outer edge of a flange end face 16 of the inner race (see FIG. 10) in sliding contact with a roller end face 15 (see FIG. 10), and as the distance piece is trapezoid-shaped, the outlet end of said hole 21, or nozzle jet, can be positioned in close proximity to the flange end face 16.

The duct groove 9 provided circumscribing the distance piece 10 in the housing 1 is divided by partition blocks or protuberances 23 into an oil supply groove 24 communicated with the oil mist feeding hole 6 and an oil discharge groove 25 communicated with an oil discharging hole 19, such that lubricating oil will be supplied from a position above the bearing and discharged from a bottom portion thereof. In operation, dry mist is supplied through oil supply hole 6 into oil supply groove 24 and jetted out from the small nozzle holes 21 in the distance piece disposed within said groove. This oil mist is transformed into wet mist, which easily adheres to an object, owing to temperature fall caused by adiabatic expansion of air and flow disturbance caused by oil jet, and is thereby deposited on the lubricating section. The amount of this oil deposit is gradually increased with lapse of operating time and excess portion thereof is reservoired as extra oil in the lower part of the housing or at the bottom of the bearing, centering around each distance piece therein. Oil from this oil reservoir flows out from the oil discharge holes 28 in the direction of arrow and further passes through oil discharge groove 25 into branched oil discharge holes 26A and 26B and then is released into the atmosphere from discharge hole 19 along with floating mist in the bearing chamber. It is to be noted here that the oil discharge groove 25 is so formed as to provide an oil discharging chamber separate from the oil supply groove 24, allowing very orderly mist flow, with oil being supplied through nozzle holes 21 and with oil and air exhaust being effected through oil discharge holes 28. Further, since such oil discharge holes 28 are positioned at a level of or lower than the rolling portion of the bearing, oil is discharged out very efficiently under own weight of oil and mist pressure.

Figure 5:
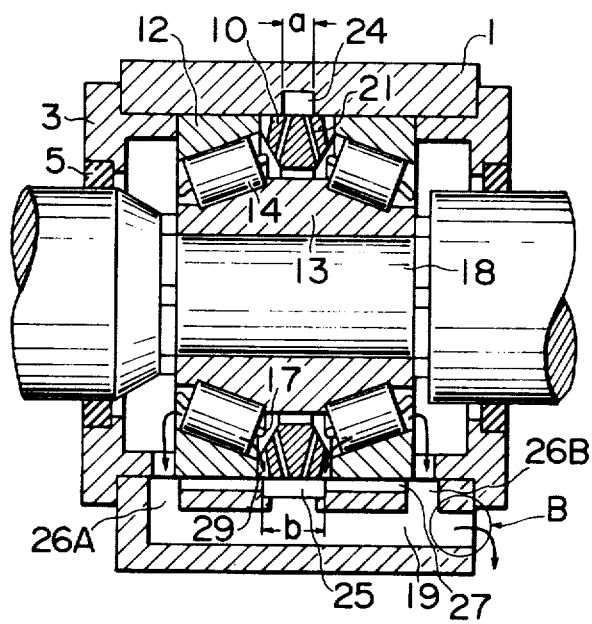
FIGS. 5 and 6 are a front sectional view and a transverse sectional view, respectively, showing another embodiment of the present invention.
Figure 6:
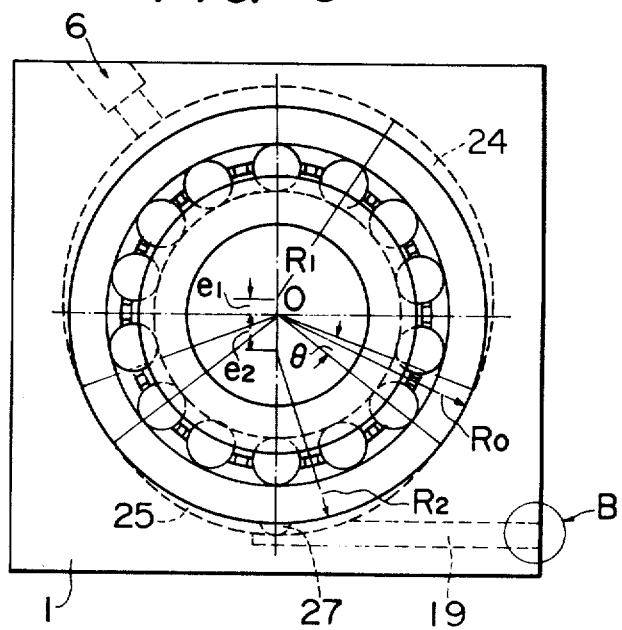

The present invention can be also embodied in the form shown in FIGS. 5 and 6. This embodiment is characterized in that an arc-shaped oil supply groove 24 and an arc-shaped oil discharge groove 25, both smaller in radius than the inner diameter Ro of the housing, are provided in the inner periphery of the bearing housing 1. The scope of working of arc of said both arc-shaped grooves 24 and 25 can be determined by adjusting their respective radii $R_1$ and $R_2$. For instance, when it is desired to provide the oil supply and discharge areas of same dimension, the center positions $e_1$ and $e_2$ of the respective eccentric circles and the arc radii $R_1$ and $R_2$ are made equal, while when it is desired to provide oil supply area wider than the oil discharge area, arrangement is made such that $e_1 < e_2$ and $R_1 < R_2$, whereby desired working can be accomplished with ease. Mist flow in this embodiment is of same pattern as in the embodiment of FIGS. 3 and 4.

FIG. 7 show data obtained from the comparative operating performance tests conducted on the bearing of the present invention having the above-described arrangement and on a conventional bearing. In the graph, curve (A) exhibits the performance curve of the conventional bearing. It shows that there is obtained no satisfactory oil mist lubricating effect, hence insufficient air cooling action, and that excess temperature rise is caused by the stirring action of oil. Curve (B) is the performance curve according to the embodiment of the present invention provided with a peculiar oil discharging mechanism. It shows that temperature rise is limited to about one-third that in the conventioanl bearing, thus ensuring high and stabilized performance. FIG. 8 shows the relation between the rotating speed N and bearing temperature rise $\Delta T$. As will be noticed from the this graph, the bearing (B) according to the present invention is capable of operating at as much as about 30% higher speed that possible with the prior art bearing (A), and a high-speed, low-loss rolling mill can be manufactured by merely improving the mechanism around the bearing.

Although in the present embodiment the oil discharge groove 29 at the bottom of the outer races 12 is of an arrangement where the branched oil discharging holes 26A and 26B are communicated with an arc-shaped groove 25, it was confirmed that the oil discharging performance is not the least affected if, for simplifying the manufacture, the groove 27 communicated with the arc-shaped oil discharging groove 25 is extended in the direction of the side plate 3 to do away with the branched holes 26A and 26B. Also, according to the lubricating method using nozzles in the distance piece projected into the bearing, sufficient effective oil deposition can be provided by using only a small amount of oil mist, and as supply of such oil mist is practiced with reduced pressures, housing pressure can be markedly reduced as compared with the conventional systems. Further, in case there is any possibility of causing ingress of alien matters from the outside, a screw or small piece 35 having a hole or groove 34 smaller in diameter than the exhaust hole 19 (see FIG. 9) leading into the atmosphere may be provided at the outlet end, indicated by B, of said exhaust hole 19 (see FIG. 5), so as to retain pressure in the housing at a desired level to thereby prevent ingress of alien matters.

In the foregoing embodiment of the present invention, the distance piece formed with the oil mist injection nozzles is trapezoidal in general configuration as shown in FIG. 10. Therefore, each injection nozzle hole 21 is arranged to be directed toward the outer edge of the flange end face 16 in sliding contact with the roller end face 15, with the fore end of said hole being positioned as close to the flange end face as possible. This distance piece 10, however, may be altered in its configuration as in the following embodiment.

FIG. 11 shows, in section, a modification where the distance piece 10 is T-shaped and L-shaped slits 21 are provided therein alternately, and FIG. 12 shows another modification where T- or Y-shaped slits 21 are provided in the T-shaped distance piece 10. In still another modification shown in FIG. 13, slits 21 are formed with inclinations in the vertical and horizontal directions relative to the axis, and FIG. 14 shows yet another embodiment where a nozzle head 22 is detachably secured to a part or along the entire periphery of the distance piece such that said nozzle head will project into the bearing chamber. Sliding of the retainer means 17 and rollers 14 is an important factor in practicing lubrication of the bearing according to the present invention. It is therefore desirable to arrange the injection nozzle holes 21 in plural rows in the diametrical direction of the distance piece, as shown in FIG. 15, so as to effect lubrication between said retainer means 17 and rollers 14 simultaneously with lubrication over the roller end and flange end faces.

The above-described arrangements of the distance piece used in the present invention produce the following splendid effects in practical use. That is, the wet mist which has passed through the slits 21 is scarcely condensed in other parts than the areas to be lubricated and its deposition is concentrated on the end faces 15 of the rollers, allowing sufficient supply of lubricating oil to the inner race flange end faces 16, too. Further, since scattering of lubricating oil cause by centrifugal force with rotation of the inner race flange end face 16 is confined to minimum by the axial component of force developed by hitting of injected air against the roller end faces, sufficient lubrication is provided on the inner race flange end face 16 where the greatest amount of frictional heat is produced. Moreover, increased air cooling efficiency can prevent burning and also stabilized supply of lubricating oil is assured by direct injection of oil mist to the rolling face of the inner race, thus phenomenally improving the bearing performance.

The present invention can be also embodied with the following arrangements. That is, FIG. 16 shows a sectional view of the housing and the lower portion of a bearing according to this embodiment, where, instead of employing the above-said arrangement for effecting oil supply from above and oil discharge from bottom, the oil supplied and air cooled area is expanded over the entire periphery of the bearing. As seen in the figure, the oil supplying duct groove 9 is provided in communication with the entire surroundings as in the conventional systems and oil discharge grooves 30 independent of said oil supply groove 9 are disposed on both sides of said supply groove 9 such as to circumscribe the oil discharge groove 29 in the distance piece shown in FIG. 5. In operation, this embodiment demonstrates the same performance characteristics as those of the bearing shown in FIGS. 7 and 8. In case no sufficient space can be acquired for the oil supply and discharge grooves 9, 30 because of a specific arrangement of the distance piece 10 as shown in FIG. 17, it is possible to provide an oil discharge groove 31 on the end face of each outer ring constructed in contact with the distance piece. It is also possible to provide a recess 33 in a spacer ring 32 disposed between the distance piece 10 and outer rings 12 so that said recess 33 will serve as oil discharging groove.

in a multiple-row roller bearing, it is impossible to incorporate the rollers 14 along with the distance piece having a protuberance such as above-described. In the bearing of the present invention, the inner race 13, rollers 14 and retainer means 17 are arranged integral with each other, and as shown in FIGS. 19 and 20, the distance piece 10 is divided in multiple segments and these segments are assembled individually. Every divided portion C can be securely fastened by combination of a guide groove 36 and a cotter or key 37 to prevent removal or dislocation of the divided segments of the distance piece when installing the bearing. Such fastening can be also accomplished by providing a contant-width recessed groove 38 along the entire outer periphery of the distance piece as shown in FIG. 21 and fitting therein an internal piston ring or snap ring to thereby integrate the divided distance piece segments.

As described above, there is provided according to the present invention a bearing which is always provided with highly reliable lubrication and can stand long-time continuous operation, by eliminating extra lubricating oil in the multiple-row roller bearing utilizing oil mist lubricating system.

In addition, it should be understood that the present invention can be also applied for a four-row type roller bearing, a six-row type roller bearing or the like other than the two-row type roller bearing inclusive of a single-row type, although the above-described embodiments have been explained as a two-row type roller bearing. Further, the present invention can be naturally applied for a roller bearing of cylindrical type or the like other than conical type.

What is claimed is:

1. A multiple row roller bearing comprising
   at least two rows of roller bearings, each of said rows including inner and outer races for said roller bearings,
   first means for separating the outer races of respective rows of said roller bearings, said first means including nozzle means for injecting lubricant to said roller bearings and discharge means for discharging said lubricant from said roller bearings,
   second means for supplying said lubricant to said nozzle means, and
   third means for exhausting said lubricant from said discharge means, said third means being independent and separated from said second means such that a positive flow of said lubricant through said roller bearings is effected.

2. A multiple row roller bearing according to claim 1, wherein said first means comprises a spacer member between said outer races, said spacer member defining a bearing chamber with respective roller bearings of said at least two rows, and wherein said nozzle means include at least one bore communicating through said spacer member into said bearing chamber.

3. A multiple row roller bearing according to claim 2, wherein at least one of said bores opens into said bearing chamber adjacent to each of said respective roller bearings.

4. A multiple row roller bearing according to claim 3, wherein said nozzle means injects a fine mist of said lubricant to each of said respective roller bearings.

5. A multiple row roller bearing according to claim 4, wherein each of said respective roller bearings are supported by said inner races by a flange end surface of said inner races in sliding contact with an end face of said roller bearings, said fine mist of said lubricant adhering to said flange end surface and said end face of said roller bearings.

6. A multiple row roller bearing according to claim 2, wherein said second means includes a first duct circumscribing at least a portion of said spacer member, said first duct communicating with each of said bores of said nozzle means, and a channel means for feeding air and said lubricant to said first duct.

7. A multiple row roller bearing according to claim 6, wherein said third means includes at least one second duct at the outer periphery of said spacer member, said second duct being separated from said first duct, and each of said second ducts being in communication with said discharge means.

8. A multiple row roller bearing according to claim 7, wherein said first and second ducts are separated by partition members of a housing of said at least two rows of roller bearings.

9. A multiple row roller bearing according to claim 8, wherein said first duct has a greater circumferential length about said spacer member than that of said at least one second duct.

10. A multiple row roller bearing according to claim 8, wherein said discharge means include discharge holes in said spacer member, said discharge holes being disposed at a level of or lower than the lowest of a roller bearing contacting surface of said outer races.

11. A multiple row roller bearing according to claim 10, wherein said discharge holes have a larger cross-section than said bores of said nozzle means.

12. A multiple row roller bearing according to claim 7, wherein each of said first and second ducts are provided by arc-shaped grooves extending into a bearing housing surrounding said outer races and spacer member, each of said arc-shaped grooves having first and second radii respectively smaller than the radius of the inner periphery of said bearing housing and having first and second centers respectively offset with respect to the center of said bearing housing such that said first and second arc-shaped grooves are separated by portions of said inner periphery of said bearing housing between respective arcs.

13. A multiple row roller bearing according to claim 12, wherein said first radius is greater than said second radius and said first center is offset from said center of said bearing housing at a distance greater than that of said second center, such that said first duct has a greater volume than said at least one second duct.

14. A multiple row roller bearing according to claim 12, wherein said discharge means include at least one slot at least at one side of said spacer member facing end surfaces of said outer races, said slot discharging lubricant from said bearing chamber to said at least one second duct.

15. A multiple row roller bearing according to claim 14, wherein said at least one slot has a greater cross-section than said at least one bore of said nozzle means.

16. A multiple row roller bearing according to claim 2, wherein said spacer member has a substantially trapezoidal configuration such that each bore opening into said bearing chamber is disposed close to a flange end surface of said inner race in sliding contact with an end face of each respective roller bearing.

17. A multiple row roller bearing according to claim 16, wherein each said bore extends through said substantially trapezoidal configuration with an inclination from said second means at the broad base of said trapezoidal configuration to said bearing chamber at the pitched sides of said trapezoidal configuration.

18. A multiple row roller bearing according to claim 2, wherein said spacer member has a T-shaped configuration with each of said bores having at least one of an L-shape, a T-shape or a Y-shape extent in said spacer member.

19. A multiple row roller bearing according to claim 2, wherein said spacer member includes a plurality of nozzle heads detachably secured along the periphery of said spacer member, each of said nozzle heads projecting into said bearing chamber.

20. A multiple row roller bearing according to claim 7, wherein said first duct circumscribes the entire outer periphery of said spacer member, and said second duct includes two discharge channels being disposed independently at each side of said first duct, said two discharge channels being separated from said first duct by a portion of a bearing housing of said at least two rows of roller bearings.

21. A multiple row roller bearing according to claim 20, wherein said discharge means includes at least two slots at respective sides of said spacer member facing end surfaces of said outer races, each of said two slots discharging lubricant from said bearing chamber to respective ones of said two discharge channels.

22. A multiple row roller bearing according to claim 6, wherein said third means include at least one discharge duct at the end face of said outer race in contact with said spacer member, said at least one discharge duct forming said discharge means in communication with said bearing chamber.

23. A multiple row roller bearing according to claim 6, wherein spacer rings are provided between the end faces of said outer races and said spacer member, and wherein said third means includes at least one recess in at least a portion of said spacer rings, said recess forming a discharge channel from said bearing chamber.

24. A multiple row roller bearing according to claim 2, wherein said spacer member includes multiple segments.

25. A multiple row roller bearing according to claim 24, wherein said multiple segments are secured by a combination of guide means and key means.

26. A multiple row roller bearing according to claim 24, wherein said multiple segments are secured by a snap-ring fitted into a groove along the entire outer periphery of said spacer member.

27. A multiple row roller bearing according to claim 1, wherein said third means includes at least one discharging channel in communication with said discharge means to exhaust said lubricant away from said rows of roller bearings out of a bearing housing.

28. A multiple row roller bearing according to claim 27, wherein fourth means for preventing ingress of alien matter into said bearing housing and for maintaining said lubricant at a predetermined pressure in said housing is provided at an exit end of said at least one discharging channel.

29. A multiple row roller bearing according to claim 1, wherein said nozzle means injects a fine mist of said lubricant to each of said respective roller bearings.

30. A multiple row roller bearing according to claim 8, wherein said spacer member has a substantially trapezoidal configuration such that each bore opening into said bearing chamber is disposed close to a flange end surface of said inner race in sliding contact with an end face of each respective roller bearing.

31. A multiple row roller bearing according to claim 30, wherein each said bore extends through said substantially trapezoidal configuration with an inclination from said second means at the broad base of said trapezoidal configuration to said bearing chamber at the pitched sides of said trapezoidal configuration.

32. A multiple row roller bearing according to claim 12, wherein said spacer member has a substantially trapezoidal configuration such that each bore opening into said bearing chamber is disposed close to a flange end surface of said inner race in sliding contact with an end face of each respective roller bearing.

33. A multiple row roller bearing according to claim 32, wherein each said bore extends through said substantially trapezoidal configuration with an inclination from said second means at the broad base of said trapezoidal configuration to said bearing chamber at the pitched sides of said trapezoidal configuration.

* * * * *